(12) United States Patent
Taylor

(10) Patent No.: US 12,208,717 B2
(45) Date of Patent: Jan. 28, 2025

(54) SEAT FOR A VEHICLE

(71) Applicant: FERRARI S.p.A., Modena (IT)

(72) Inventor: Daniel Martin Taylor, Modena (IT)

(73) Assignee: FERRARI S.p.A., Modena (IT)

( * ) Notice: Subject to any disclaimer, the term of this patent is extended or adjusted under 35 U.S.C. 154(b) by 135 days.

(21) Appl. No.: 18/053,889

(22) Filed: Nov. 9, 2022

(65) Prior Publication Data
US 2023/0150408 A1  May 18, 2023

(30) Foreign Application Priority Data
Nov. 18, 2021 (IT) .................. 102021000029159

(51) Int. Cl.
*B60N 2/64* (2006.01)
*B60N 2/70* (2006.01)

(52) U.S. Cl.
CPC .............. *B60N 2/70* (2013.01); *B60N 2/646* (2013.01)

(58) Field of Classification Search
CPC ..................................... B60N 2/646
USPC ................................... 297/452.27
See application file for complete search history.

(56) References Cited

U.S. PATENT DOCUMENTS

| | | | | |
|---|---|---|---|---|
| 3,612,607 A * | 10/1971 | Lohr | .......... | A47C 7/18 297/452.27 X |
| 4,522,447 A * | 6/1985 | Snyder | .......... | A47C 7/18 297/452.37 X |
| 4,699,427 A * | 10/1987 | Kobayashi | .......... | B64D 11/06 297/452.27 X |
| 4,784,437 A * | 11/1988 | Shimada | .......... | B60N 2/7017 297/452.27 X |
| 4,813,738 A * | 3/1989 | Ito | .......... | B60N 2/7017 297/452.27 X |
| 4,819,288 A * | 4/1989 | Lowthian | .......... | A47C 27/148 297/452.27 X |
| 4,865,379 A * | 9/1989 | Aoki | .......... | B60N 2/70 297/452.27 X |
| 5,283,918 A * | 2/1994 | Weingartner | .......... | D04B 21/14 297/452.27 X |
| 5,564,144 A * | 10/1996 | Weingartner | .......... | B60N 2/70 297/452.27 X |
| 7,040,707 B2 * | 5/2006 | Nakahara | .......... | B60N 2/5621 297/452.27 X |
| 7,275,793 B2 * | 10/2007 | Fujita | .......... | D04B 21/16 297/452.27 X |

(Continued)

FOREIGN PATENT DOCUMENTS

FR  2841508 A1  1/2004

OTHER PUBLICATIONS

Italian Search Report for Application No. 102021000029159 completed Jul. 1, 2022.

*Primary Examiner* — Rodney B White
(74) *Attorney, Agent, or Firm* — CANTOR COLBURN LLP

(57) ABSTRACT

A seat for a vehicle comprising a bearing structure, which is elastically deformable, is divided into a cushion and a backrest and is obtained by means of a foam having a net-like structure. The bearing structure of the cushion has: an outer zone, which extends along the entire periphery of the cushion and has a first bearing capacity; and an inner zone, which extends at the centre, is completely surrounded—on all sides—by the outer zone and has a second bearing capacity smaller than the first bearing capacity.

33 Claims, 8 Drawing Sheets

(56) References Cited

U.S. PATENT DOCUMENTS

| | | | | |
|---|---|---|---|---|
| 7,585,030 B2 * | 9/2009 | Galbreath | ................ | B60N 2/70 |
| | | | | 297/452.27 X |
| 7,614,704 B2 * | 11/2009 | Whelan | ................ | A61G 5/1043 |
| | | | | 297/452.27 X |
| 7,730,566 B2 * | 6/2010 | Flick | ................ | A61G 7/05738 |
| | | | | 297/452.27 X |
| 8,147,001 B2 * | 4/2012 | Boren | ................ | B64D 11/0619 |
| | | | | 297/452.27 X |
| 8,215,714 B2 * | 7/2012 | Galbreath | ................ | B60N 2/70 |
| | | | | 297/452.27 X |
| 9,004,605 B2 * | 4/2015 | Nishiyama | ............. | B60N 2/646 |
| | | | | 297/452.27 |
| 10,272,800 B2 | 4/2019 | Whitmore | | |
| 11,679,699 B2 * | 6/2023 | Haller | ................ | B60N 2/2222 |
| | | | | 297/284.3 |
| 11,845,371 B2 * | 12/2023 | Hayashi | ................ | B60N 2/646 |
| 2006/0273650 A1 * | 12/2006 | Embach | ................ | B60N 2/70 |
| | | | | 297/452.27 |
| 2022/0258654 A1 * | 8/2022 | Hering | ................ | B60N 2/6009 |

* cited by examiner

| P1 | 7,5 - 10,0 kPa |
| P2 | 5,4 - 6,6 kPa |
| P3 | 4,5 - 5,5 kPa |
| P4 | 3,6 - 4,4 kPa |
| P5 | 1,6 - 2,4 kPa |
| P6 | 5,5 - 7,0 kPa |
| P7 | 11,0 - 13,0 kPa |

Fig. 8

SEAT FOR A VEHICLE

CROSS-REFERENCE TO RELATED APPLICATIONS

This patent application claims priority from Italian patent application no. 102021000029159 filed on Nov. 18, 2021, the entire disclosure of which is incorporated herein by reference.

TECHNICAL SECTOR

The invention relates to a seat for a vehicle.

PRIOR ART

The seat of a vehicle consists of a seat cushion having a substantially horizontal arrangement and of a backrest having a substantially vertical arrangement.

From a constructive point of view, the seat of a vehicle comprises a frame (typically made of metal or composite material), which is fixed to the floorboard of the vehicle, a bearing structure, which is mounted on the frame and is elastically yielding, and an upholstery, which covers the bearing structure and makes up the aesthetic and tactile interface to the outside (the upholstery can be made of fabric or leather).

Manufacturers recently suggested manufacturing the bearing structure of a seat by means of a net-like structure, which is built with 3D printers (namely, through additive manufacturing).

Patent U.S. Ser. No. 10/272,800B2 discloses a seat for a car having a main cushion, which is coupled to a shield, which surrounds at least part of the lateral sides of the main cushion and is made of a foam that is less compressible (namely, harder) compared to the main cushion.

DESCRIPTION OF THE INVENTION

The object of the invention is to provide a seat for a vehicle, which offers high comfort combined with reduced weight and small sizes.

According to the invention, there is provided a seat for a vehicle as claimed in the appended claims.

The appended claims describe preferred embodiments of the invention and form an integral part of the description.

BRIEF DESCRIPTION OF THE DRAWINGS

The invention will now be described with reference to the accompanying drawings, showing some non-limiting embodiments thereof:

FIG. 8 is a table summing up the value of the bearing capacity of different parts of a bearing structure of the seat of FIG. 1.

PREFERRED EMBODIMENTS OF THE INVENTION

Figure 1:
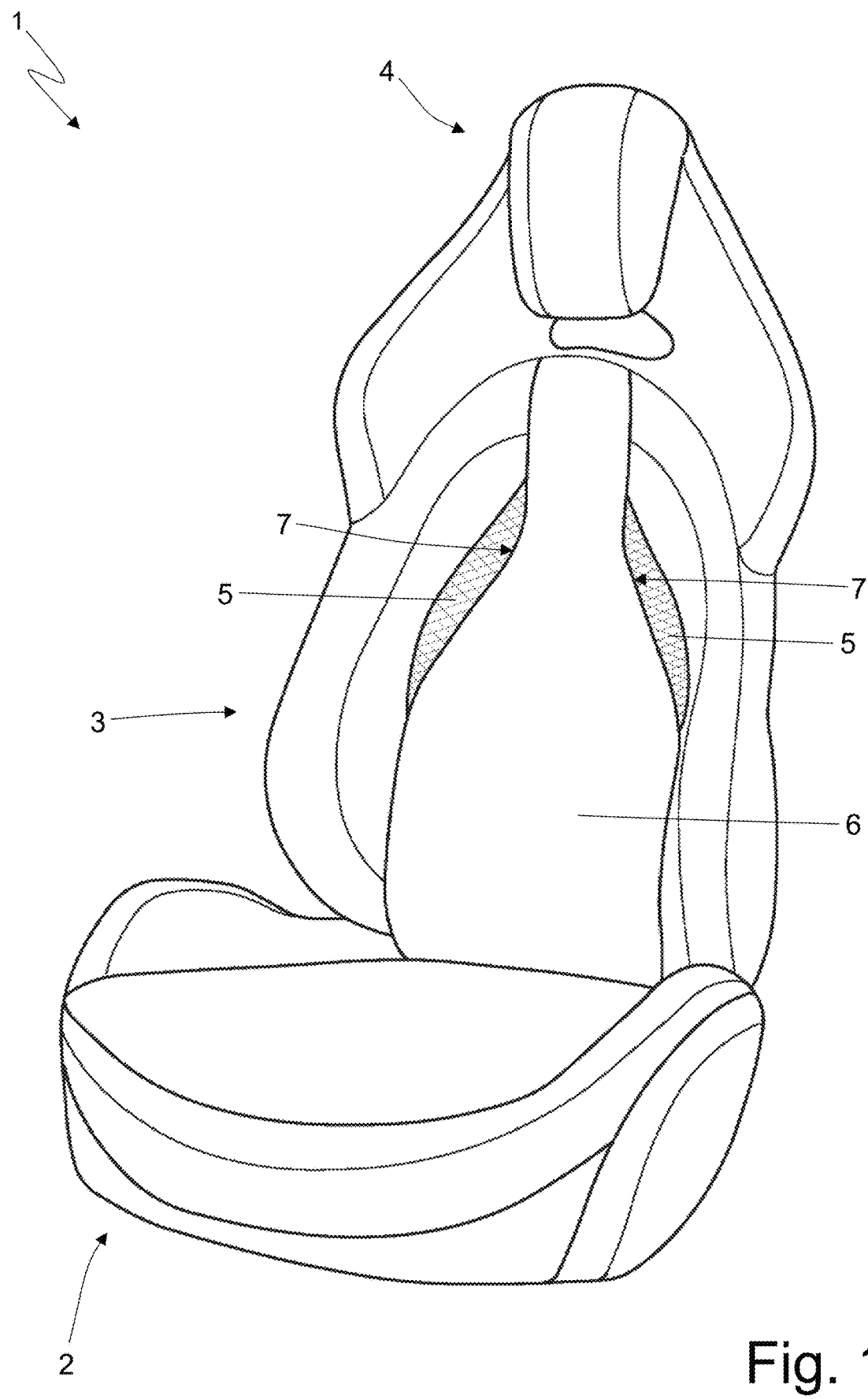
FIG. 1 is a perspective view of a seat for a vehicle according to the invention.

In FIG. 1, number 1 indicates, as a whole, a seat for a vehicle.

The seat 1 consists of a seat cushion 2 having a substantially horizontal arrangement and of a backrest 3 having a substantially vertical arrangement; together, the cushion 2 and the backrest 3 give the seat 1 an "L" shape. The backrest 3 ends, at the top, with a headrest 4, which is included in the backrest 3 (namely, forms one single indivisible body with the backrest 3).

From a constructive point of view, the seat 1 comprises a frame (typically made of metal or composite material), which is fixed to the floorboard of the vehicle, a bearing structure 5 (better shown in FIGS. 2-5), which is mounted on the frame and is elastically yielding, and an upholstery 6 (visible in FIG. 1), which covers the bearing structure 5 and makes up the aesthetic and tactile interface to the outside (the upholstery 6 can be made of fabric or leather).

According to a preferred embodiment, the upholstery 6 covering the bearing structure 5 has two twins through windows 7, which are arranged at a given distance from one another, expose the bearing structure 5 lying underneath and are arranged in the area of the backrest 3; in particular, each through window 7 has an oblong shape (namely, has a length that is significantly greater than the width) arranged vertically.

The bearing structure 5 of the seat 1 is obtained by means of a polyurethane foam having a net-like structure, which is built with 3D printers (namely, through additive manufacturing). As described more in detail below, the bearing structure 5 does not feature an even bearing capacity (namely, the same bearing capacity everywhere), but it has a differentiated bearing capacity changing from zone to zone.

The bearing capacity (or compression resistance) of a foam is a measure of the load resistance (namely, of the compression resistance) thereof: the higher the value of the bearing capacity, the stiffer and harder (namely, more rigid) the foam and vice versa. The bearing capacity is usually measured in KPa for it is measured as pressure needed to obtain a predetermined deformation of the foam. In particular according to the IOS 1798 method corresponding to the UNI 6351 regulation, the bearing capacity of a foam is equal to the pressure (measured in KPa) needed to obtain a deformation value corresponding to 40% of a sample (having a surface of 323 square centimetres) subjected to compression (namely, the pressure needed to obtain a deformation that reduces by 40% the initial value of the thickness of the sample subjected to compression).

Figure 2:
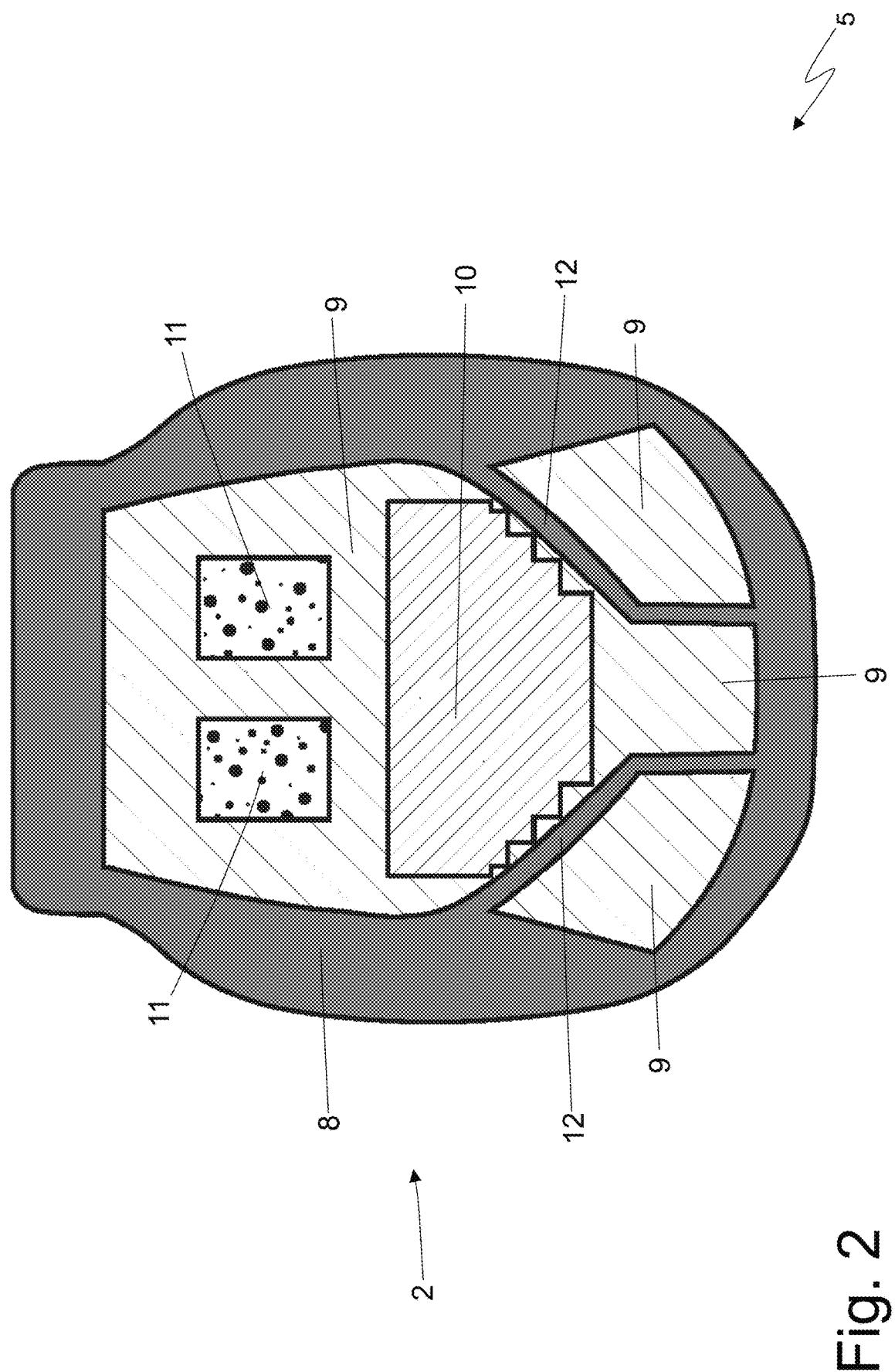
FIG. 2 is a schematic view of a cushion of the seat of FIG. 1.
Figure 3:
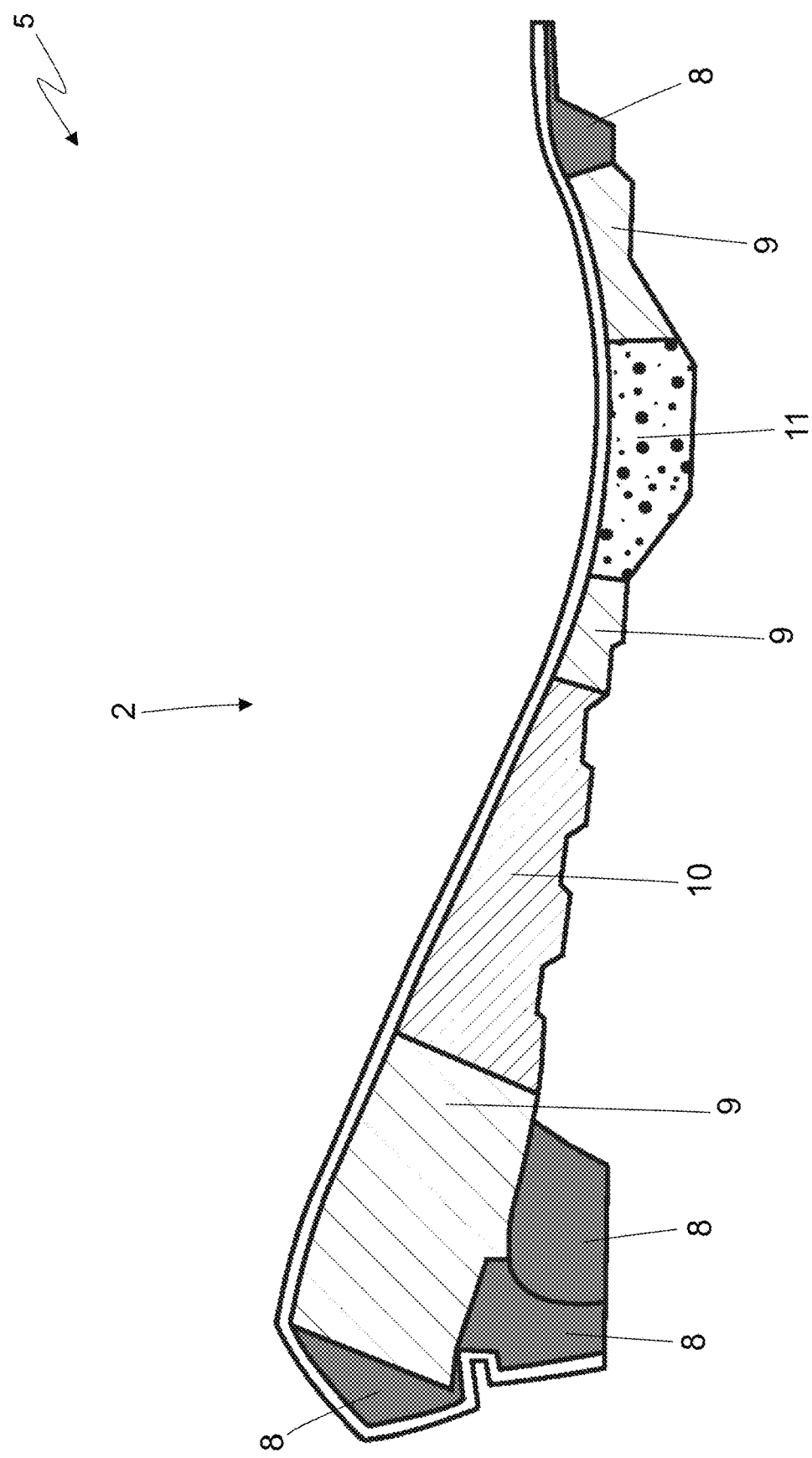
FIG. 3 is a schematic, longitudinal section view of the cushion of FIG. 2.

According to FIGS. 2 and 3, the bearing structure 5 of the cushion 2 comprises an outer zone 8, which extends along the entire periphery of the cushion 2 and has a first bearing capacity P1 (ranging from 7.5 to 10.0 kPa), and an inner zone 9, which extends at the centre, is completely surrounded—on all sides—by the outer zone 8 and has a bearing capacity P2 (ranging from 5.4 to 6.6 kPa) smaller than the bearing capacity P1. According to a preferred embodiment, the bearing capacity P2 ranges from 55% to 85% of the bearing capacity P1.

The bearing structure 5 of the cushion 2 comprises an insert 10, which is completely arranged within the inner zone 9, is at the centre of the cushion 2 and has a third bearing capacity P3 (ranging from 5.4 to 6.6 kPa) smaller than the bearing capacity P2. According to a preferred embodiment, the bearing capacity P3 ranges from 75% to 90% of the bearing capacity P2. According to a preferred embodiment, the insert 10 at least partially has the shape of a truncated cone, which reduces its size moving away from the cushion 2; in particular, the insert 10 has a rear part with a rectangular shape, which is arranged at the back of the cushion 2 (namely, in the area of the backrest 3), and a front part (joined to the rear part without gaps) with a trapezoidal shape, which is arranged at the front of the cushion 2.

According to a preferred embodiment, the bearing structure 5 of the cushion 2 comprises two twin inserts 11, which are separate from one another, are arranged next to one another completely within the inner zone 9, are located between the insert 10 and the backrest 3 (remaining at a given distance other than zero both from the insert 10 and from the backrest 3), and have a bearing capacity P4 (ranging from 3.6 to 4.4 kPa) smaller than the bearing capacity P3. According to a preferred embodiment, the bearing capacity P4 ranges from 60% to 72% of the bearing capacity P2. According to a preferred embodiment, each insert 11 has a rectangular shape.

According to a preferred embodiment, the outer zone 8 comprises two separate twin ribs 12, which extend within the inner zone 9 and flank part of the insert 10.

Figure 4:
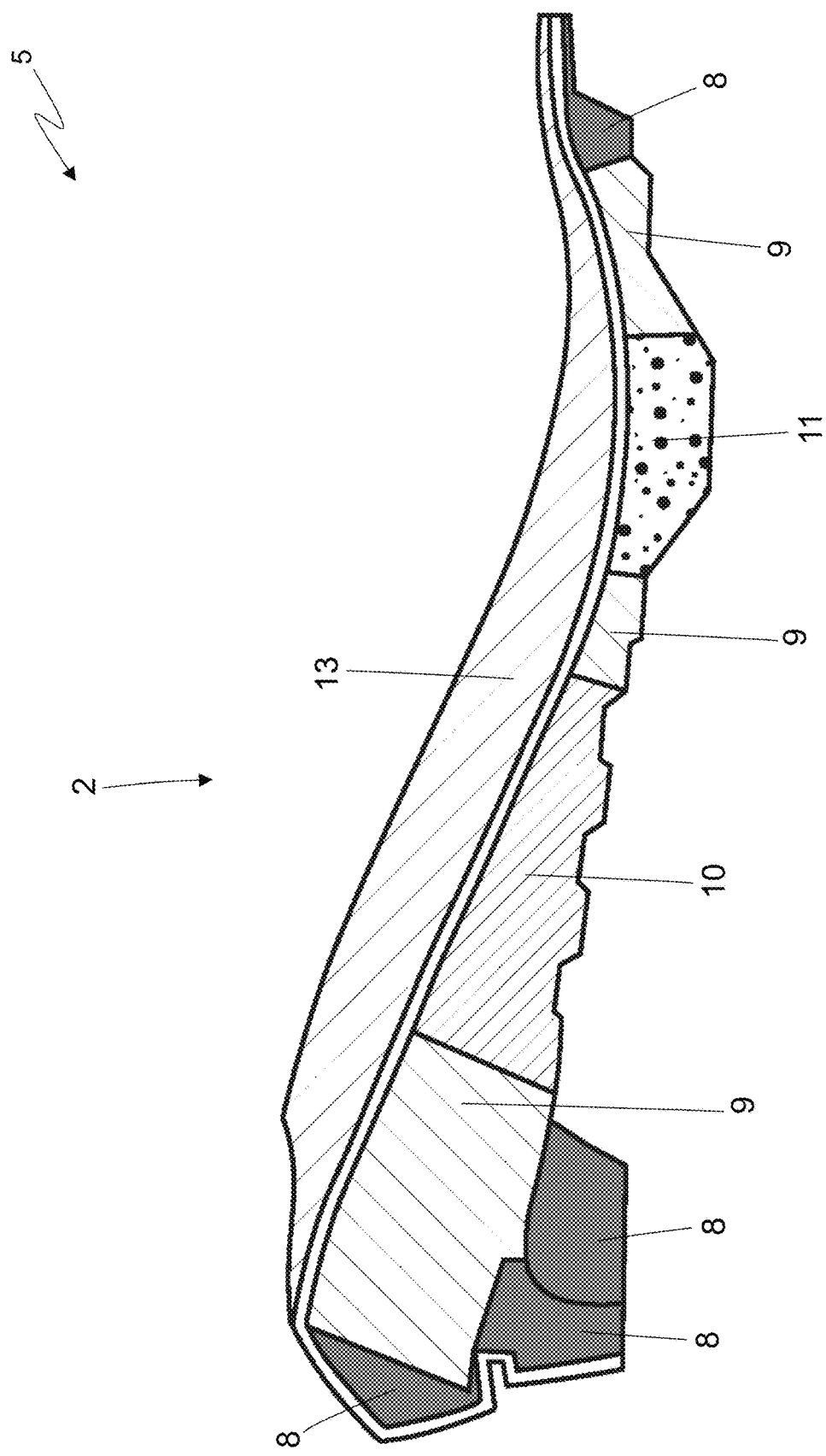
FIG. 4 is a schematic, longitudinal section view of a variant of the cushion of FIG. 2.

In the embodiment shown in FIG. 4, the bearing structure 5 of the cushion 2 also comprises a cover 13, which covers, at the top, both the outer zone 8 and the inner zone 9 (namely, covers the entire cushion 2) and has a bearing capacity P5 (ranging from 1.6 to 2.4 kPa) smaller than the bearing capacity P2 (and also smaller than the bearing capacities P3 and P4). According to a preferred embodiment, the bearing capacity P5 ranges from 25% to 40% of the bearing capacity P2. In the embodiment shown in FIG. 4, the bearing structure 5 of the cushion 2 is not provided with the cover 13.

Figure 5:
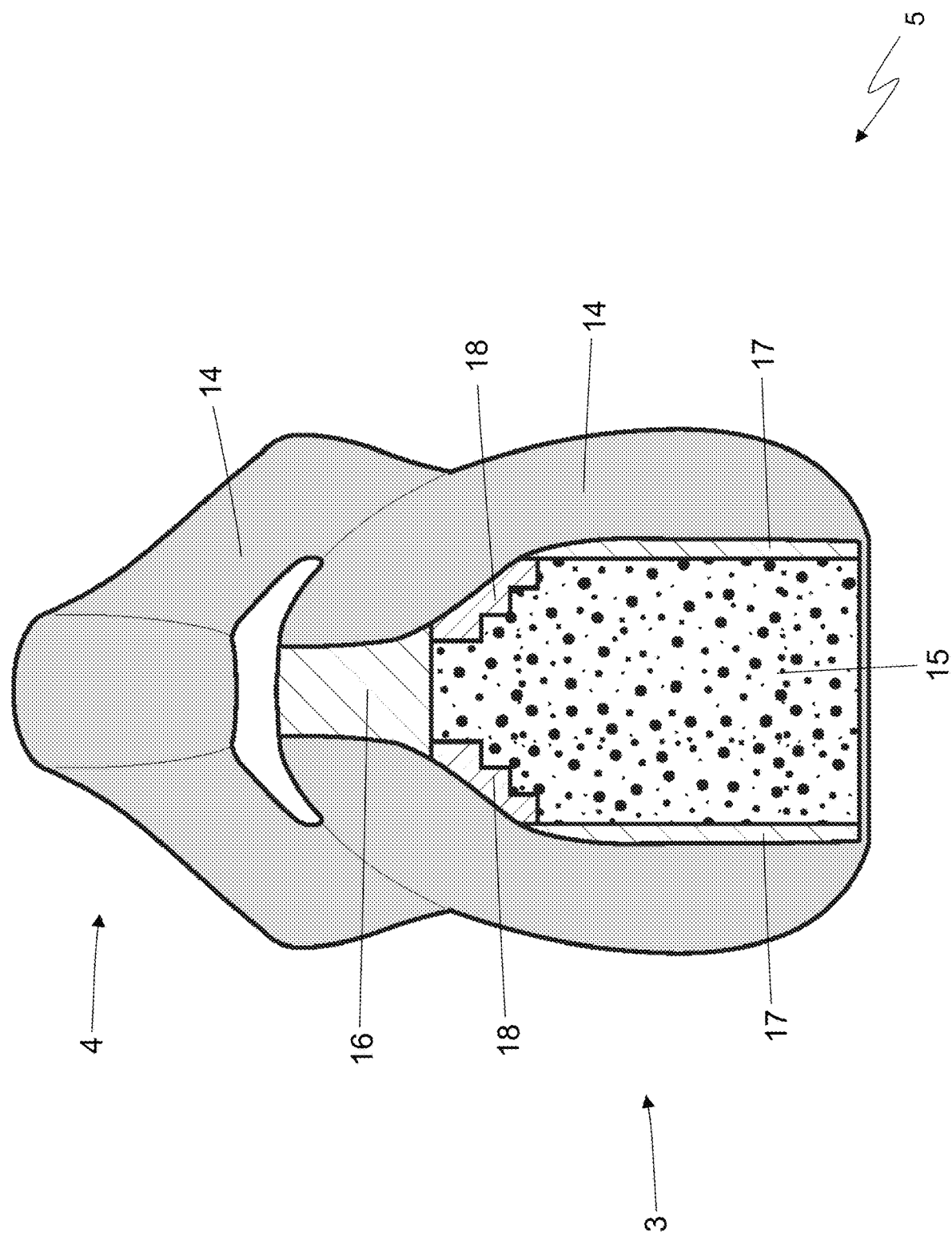
FIG. 5 is a schematic view of a backrest of the seat of FIG. 1.

According to FIG. 5, the bearing structure 5 of the backrest 3 comprises an outer zone 14, which has the shape of an upside-down "U", extends along the periphery of the backrest 3 and has at least a bearing capacity P6 (ranging from 5.5 to 7.0 kPa), which is comprised between the bearing capacity P1 and the bearing capacity P2. Furthermore, the bearing structure 5 of the backrest 3 comprises an inner zone 15, which extends at the centre, is surrounded on three sides by the outer zone 14, on the lower side borders the bearing structure 5 of the cushion 2 and has the bearing capacity P4 smaller than the bearing capacity P6 and the bearing capacity P2. According to a preferred embodiment, the bearing capacity P4 ranges from 55% to 80% of the bearing capacity P6 and the bearing capacity P2 ranges from 85% to 95% of the bearing capacity P6.

According to a preferred embodiment, the bearing structure 5 of the backrest 3 includes the headrest 4, which completely belongs to the outer zone 14 and, hence, has the bearing capacity P6.

According to a preferred embodiment, the bearing structure 5 of the backrest 3 comprises an insert 16, which is arranged at the centre within the outer zone 14 and above the inner zone 15 and has the bearing capacity P2 smaller than the bearing capacity P6.

According to a preferred embodiment, the bearing structure 5 of the backrest 3 comprises two twin inserts 17, which are separate from one another, are arranged on the two opposite sides of the inner zone 15 between the inner zone 15 and the outer zone 14 and have the bearing capacity P2 smaller than the sixth bearing capacity P6.

According to a preferred embodiment, the bearing structure 5 of the backrest 3 comprises two twin inserts 18, which are separate from one another, are arranged on the two opposite sides of the inner zone 15 between the inner zone 15 and the outer zone 14, are located above the inserts 17 and have the bearing capacity P3 smaller than the bearing capacity P2. According to a preferred embodiment, the bearing capacity P2 ranges from 75% to 90% of the bearing capacity P3.

Figure 6:
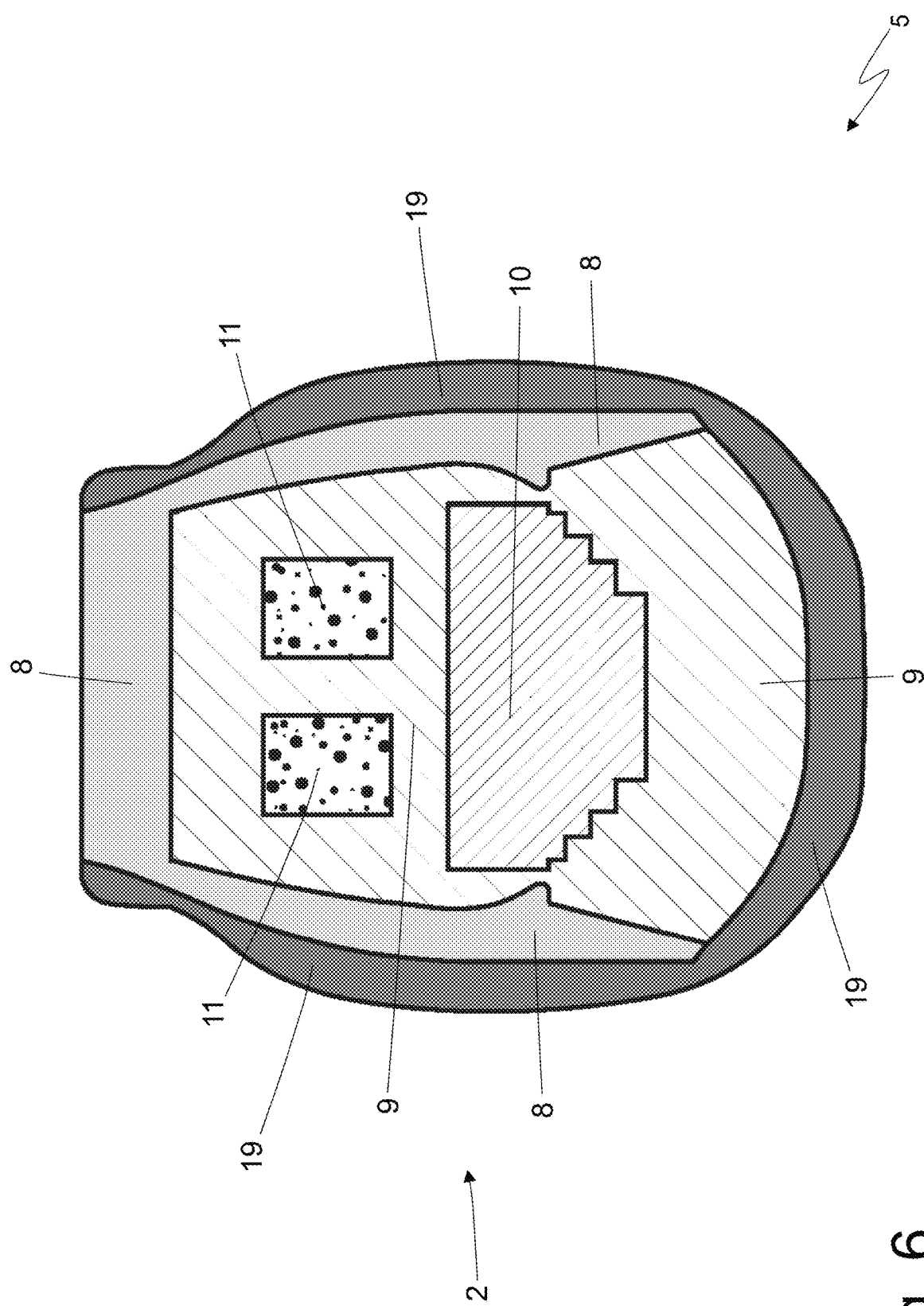
FIG. 6 is a schematic view of a different embodiment of the cushion of FIG. 3.

In the alternative embodiment shown in FIG. 6, the outer zone 8 (having the bearing capacity P1 ranging from 7.5 to 10.0 kPa) of the bearing structure 5 of the cushion 2 does not extend along the entire periphery of the cushion 2, but it extends only on three sides of the cushion 2, thus having the shape of a "U" where the open zone faces the front (namely, faces the opposite way relative to the backrest 3). Namely, the outer zone 8 is U-shaped and surrounds on three sides (at the back and on the sides) the inner zone 9 and, hence, the outer zone 8 engages on three sides (at the back and on the sides) the periphery of the cushion 2.

Furthermore, in the alternative embodiment shown in FIG. 6, the bearing structure 5 of the cushion 2 has a contour zone 19, which is U-shaped and surrounds on three sides (at the front and on the sides) the inner zone 9 and the outer zone 8, namely the contour zone 19 engages on three sides (at the front and on the sides) the periphery of the cushion 2. The contour zone 19 has a bearing capacity P7 (ranging from 11.0 to 13.0 kPa) higher than the bearing capacity P1. According to a preferred embodiment, the bearing capacity P7 ranges from 110% to 170% of the bearing capacity P1. In particular, on the sides, the contour zone 19 rises from the remaining part of the cushion 2 so as to define two side panels that provide a suitable lateral containment to the cushion 2; on the other hand, at the front, the contour zone 19 is lowered relative to the remaining part of the cushion 2.

Finally, in the alternative embodiment shown in FIG. 6, the outer zone 8 is not provided with the two separate twin ribs 12, which extend within the inner zone 9 and flank part of the insert 10.

Figure 7:
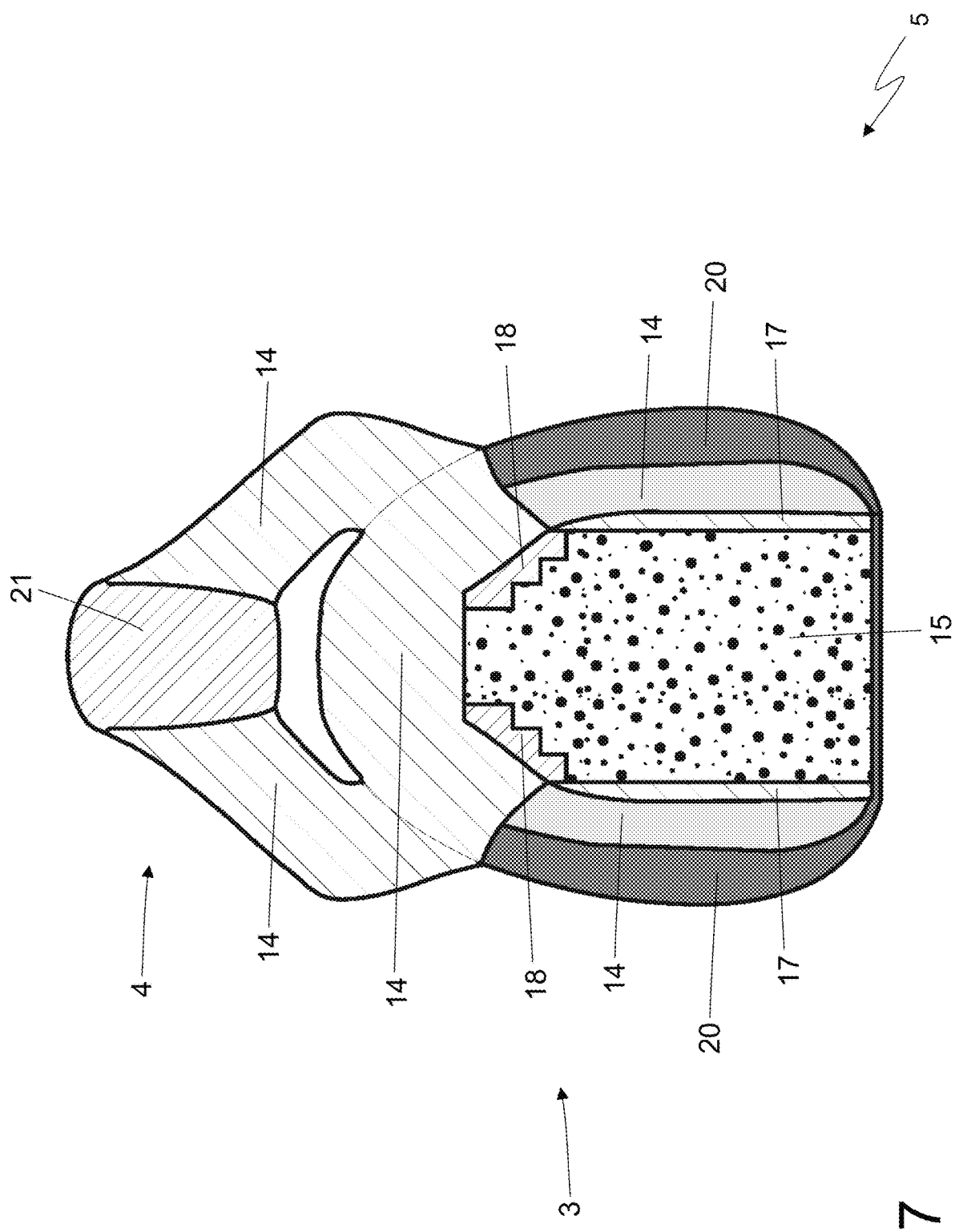
FIG. 7 is a schematic view of a different embodiment of the backrest of FIG. 2.

In the alternative embodiment shown in FIG. 7, the outer zone 14 (shaped like an upside-down "U") of the bearing structure 5 of the backrest 3 has two different bearing capacities: an upper part of the outer zone 14 (shaped like an upside-down "U") has the bearing capacity P6 (ranging from 5.5 to 7.0 kPa) while a lower part of the outer zone 14 (shaped like an upside-down "U") has the bearing capacity P1 (ranging from 7.5 to 10.0 kPa). Namely, the upper cusp of the outer zone 14 (shaped like an upside-down "U") has the bearing capacity P6 while the two legs of the outer zone 14 (shaped like an upside-down "U") have the bearing capacity P1.

In the alternative embodiment shown in FIG. 7, the bearing structure 5 of the backrest 3 has two contour zones 20, which laterally delimit the outer zone 14 (namely, the two contour zones 20 are arranged on the opposite sides of the outer zone 14) and have the bearing capacity P7 (ranging from 11.0 to 13.0 kPa) higher than the bearing capacity P1 and the bearing capacity P6. In particular, the two contour zones 20 rise from the remaining part of the backrest 3 so as to define two side panels that provide a suitable lateral containment to the backrest 3.

In the alternative embodiment shown in FIG. 7, the bearing structure 5 of the backrest 3 comprises is not provided with the insert 16, which is arranged at the centre within the outer zone 14 and above the inner zone 15 and has the bearing capacity P2 smaller than the bearing capacity P6.

Even in the embodiment shown in FIG. 7, the bearing structure 5 of the backrest 3 includes the headrest 4, which belongs to the upper part of the outer zone 14 and, hence, has the bearing capacity P2 except for a central insert 21 (right in the area of the head of the passenger), which has the bearing capacity P3 (ranging from 5.4 to 6.6 kPa) (slightly) smaller than the bearing capacity P2.

The embodiments described herein can be combined with one another, without for this reason going beyond the scope of protection of the invention.

The seat 1 described above has numerous advantages.

First of all, the seat 1 described above offers passengers a very high comfort, though featuring reduced weight and small size.

Furthermore, the seat 1 disclosed above can completely be customized so as to adjust to the actual anthropometric features of the end user.

Finally, the seat 1 described above can be manufactured in a relatively simple and quick fashion using a marketed 3D printer.

LIST OF THE REFERENCE NUMBERS OF THE FIGS 1 seat
2 cushion
3 backrest
4 headrest
5 bearing structure
6 upholstery
7 through windows
8 outer zone
9 inner zone
10 insert
11 insert
12 ribs
13 cover
14 outer zone
15 inner zone
16 insert
17 insert
18 insert
19 contour zone
20 contour zone
21 insert
P1 bearing capacity
P2 bearing capacity
P3 bearing capacity
P4 bearing capacity
P5 bearing capacity
P7 bearing capacity
P7 bearing capacity

The invention claimed is:

1. A seat (1) for a vehicle comprising a bearing structure (5) divided into an elastically deformable cushion (2) and a backrest (3),
the bearing structure (5) of the cushion (2) comprising:
a foam outer zone (8), wherein the foam outer zone is substantially U-shaped, and extends at least along a rear and lateral periphery of the cushion (2) and has a first bearing capacity (P1);
a foam inner zone (9), wherein the foam inner zone (9) extends at about a centre of the cushion, and is surrounded at least by the foam outer zone (8), wherein the foam inner zone (10) has a second bearing capacity (P2) smaller than the first bearing capacity (P1); and
a first foam insert (10) completely arranged within the foam inner zone (9) at the centre of the cushion (2) and has a third bearing capacity (P3) smaller than the second bearing capacity (P2)
wherein the foam outer zone (8) of the cushion (2) extends along an entire periphery of the cushion (2) and has a closed shape surrounding the foam inner zone (9) on all sides.

2. The seat (1) according to claim 1, wherein:
the second bearing capacity (P2) ranges from 55% to 85% of the first bearing capacity (P1); and
the first bearing capacity (P1) ranges from 7.5 to 10.0 kPa and the second bearing capacity (P2) ranges from 5.4 to 6.6 kPa.

3. The seat (1) according to claim 1, wherein the first foam insert (10) at least partially has a truncated cone-shape, which reduces a size thereof moving away from backrest (3).

4. The seat (1) according to claim 1, wherein the foam outer zone (8) comprises two separate ribs (12), which extend within the foam inner zone (9) and a flank part of the first foam insert (10).

5. The seat (1) according to claim 1, wherein:
the third bearing capacity (P3) ranges from 75% to 90% of the second bearing capacity (P2); and
the second bearing capacity (P2) ranges from 5.4 to 6.6 kPa and the third bearing capacity (P3) ranges from 4.5 to 5.5 kPa.

6. The seat (1) according to claim 1, wherein the bearing structure (5) of the cushion (2) further comprises two second foam inserts (11), which are separate from one another and are arranged next to one another completely within the foam inner zone (9), wherein the two second foam inserts are located between the first foam insert (10) and the backrest (3) and have a fourth bearing capacity (P4) smaller than the third bearing capacity (P3).

7. The seat (1) according to claim 6, wherein each of the two second foam inserts (11) has a rectangular shape.

8. The seat (1) according to claim 6, wherein:
the fourth bearing capacity (P4) ranges from 60% to 72% of the second bearing capacity (P2); and
the second bearing capacity (P2) ranges from 5.4 to 6.6 kPa and the fourth bearing capacity (P4) ranges from 3.6 to 4.4 kPa.

9. The seat (1) according to claim 1, wherein the foam outer zone (8) of the cushion (2) is U-shaped, and is open towards a front of the cushion (2) and surrounds the foam inner zone (9) at a back and sides thereof.

10. The seat (1) according to claim 1, wherein the cushion (2) further comprises an outer contour zone (19) that is U-shaped, surrounds the foam inner zone (9) and the foam outer zone (8) at a front and sides thereof, and has a seventh bearing capacity (P7) higher than the first bearing capacity (P1), and laterally defines a pair of side panels that provide lateral containment to the cushion (2).

11. The seat (1) according to claim 10, wherein:
the seventh bearing capacity (P7) ranges from 110% to 170% of the first bearing capacity (P1); and
the seventh bearing capacity (P7) ranges from 11.0 to 13.0 kPa.

12. The seat (1) according to claim 1, wherein the cushion (2) comprises a cover (13) covering top surfaces of both the foam outer zone (8) and the foam inner zone (9), and has a fifth bearing capacity (P5) smaller than the second bearing capacity (P2).

13. The seat (1) according to claim 12, wherein:
the fifth bearing capacity (P5) ranges from 25% to 40% of the second bearing capacity (P2); and
the second bearing capacity (P2) ranges from 5.4 to 6.6 kPa and the fifth bearing capacity (P5) ranges from 1.6 to 2.4 kPa.

14. A seat (1) for a vehicle comprising a bearing structure (5), divided into an elastically deformable cushion (2) and a backrest (3);
the bearing structure (5) of the cushion (2) comprising: a foam outer zone (8), wherein the foam outer zone is substantially U-shaped, and extends at least along a rear and lateral periphery of the cushion (2) and has a first bearing capacity (P1); a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and a first foam insert (10), is completely arranged within the foam inner zone (9), is at the centre of the cushion (2) and has a third bearing capacity (P3) smaller than the second bearing capacity (P2);
the bearing structure (5) of the backrest (3) comprising a foam outer zone (14) having a shape of an upside-down "U" relative to ground extending along a periphery of the backrest (3) and has at least a sixth bearing capacity (P6) having a value between the first bearing capacity (P1) and the second bearing capacity (P2); and
a foam inner zone (15) extending at about the centre of the backrest (3) surrounded on three sides by the outer zone (14), wherein the foam inner zone has a side that borders the cushion (2) and has a fourth bearing capacity (P4) smaller than the sixth bearing capacity (P6) and the second bearing capacity (P2); and a headrest integral to the foam outer zone (14) and having the sixth bearing capacity (P6).

15. The seat (1) according to claim 14, wherein:
the fourth bearing capacity (P4) ranges from 55% to 80% of the sixth bearing capacity (P6); and
the fourth bearing capacity (P4) ranges from 3.6 to 4.4 kPa and the sixth bearing capacity (P6) ranges from 5.5 to 7.0 kPa.

16. A seat (1) for a vehicle comprising a bearing structure (5), divided into an elastically deformable cushion (2) and a backrest (3);
the bearing structure (5) of the cushion (2) comprising: a foam outer zone (8), wherein the foam outer zone is substantially U-shaped, and extends at least along a rear and lateral periphery of the cushion (2) and has a first bearing capacity (P1); a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and a first foam insert (10), is completely arranged within the foam inner zone (9), is at the centre of the cushion (2) and has a third bearing capacity (P3) smaller than the second bearing capacity (P2);
the bearing structure (5) of the backrest (3) comprising: a foam outer zone (14) having a shape of an upside-down "U" relative to ground, extending along a periphery of the backrest (3) and having has at least a sixth bearing capacity (P6) having a value between the first bearing capacity (P1) and the second bearing capacity (P2); a foam inner zone (15) extending at about the centre of the backrest (3), is surrounded on three sides by the outer zone (14), wherein the foam inner zone has a side that the cushion (2) and has a fourth bearing capacity (P4) smaller than the sixth bearing capacity (P6) and the second bearing capacity (P2); and a third foam insert (16) arranged at the centre within the outer zone (14) and above the inner zone (15) and having the second bearing capacity (P2) smaller than the sixth bearing capacity (P6).

17. The seat (1) according to claim 16, wherein the bearing structure (5) of the backrest (3) comprises two fourth foam inserts (17) arranged on opposite sides of the foam inner zone (15) between the foam inner zone (15) and the foam outer zone (14) and have the second bearing capacity (P2) smaller than the sixth bearing capacity (P6).

18. The seat (1) according to claim 16, wherein:
the second bearing capacity (P2) ranges from 85% to 95% of the sixth bearing capacity (P6); and
the second bearing capacity (P2) ranges from 5.4 to 6.6 kPa and the sixth bearing capacity (P6) ranges from 5.5 to 7.0 kPa.

19. A seat (1) for a vehicle comprising a bearing structure (5), divided into an elastically deformable cushion (2) and a backrest (3);
the bearing structure (5) of the cushion (2) comprising: a foam outer zone (8), wherein the foam outer zone is substantially U-shaped, and extends at least along a rear and lateral periphery of the cushion (2) and has a first bearing capacity (P1); a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and a first foam insert (10), is completely arranged within the foam inner zone (9), is at the centre of the cushion (2) and has a third bearing capacity (P3) smaller than the second bearing capacity (P2);
the bearing structure (5) of the backrest (3) comprising: a foam outer zone (14) having a shape of an upside-down "U" relative to ground, extending along a periphery of the backrest (3) and having has at least a sixth bearing capacity (P6) having a value between the first bearing capacity (P1) and the second bearing capacity (P2); a foam inner zone (15) extending at about the centre of the backrest (3), is surrounded on three sides by the outer zone (14), wherein the foam inner zone has a side that the cushion (2) and has a fourth bearing capacity (P4) smaller than the sixth bearing capacity (P6) and the second bearing capacity (P2); and two fourth twin inserts (17), which are separate from one another and arranged on the opposite sides of the foam inner zone (15) between the foam inner zone (15) and the foam outer zone (14) and have the second bearing capacity (P2).

20. The seat (1) according to claim 19, wherein the bearing structure (5) of the backrest (3) comprises two fifth twin foam inserts (18), which are separate from one another, and arranged on the opposite sides of the foam inner zone (15) between the foam inner zone (15) and the foam outer zone (14), wherein the two fifth twin foam inserts (18) are located above the fourth foam inserts (17) and have the third bearing capacity (P3) smaller than the second bearing capacity (P2).

21. The seat (1) according to claim 20, wherein:
the second bearing capacity (P2) ranges from 75% to 90% of the third bearing capacity (P3); and
the second bearing capacity (P2) ranges from 5.4 to 6.6 kPa and the third bearing capacity (P3) ranges from 4.5 to 5.5 kPa.

22. A seat (1) for a vehicle comprising a bearing structure (5), divided into an elastically deformable cushion (2) and a backrest (3);
the bearing structure (5) of the cushion (2) comprising: a foam outer zone (8), wherein the foam outer zone is substantially U-shaped, and extends at least along a rear and lateral periphery of the cushion (2) and has a first bearing capacity (P1); a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and a first foam insert (10), is completely arranged within the foam inner zone (9), is at the centre of the cushion (2) and has a third bearing capacity (P3) smaller than the second bearing capacity (P2);
the bearing structure (5) of the backrest (3) comprising: a foam outer zone (14) having a shape of an upside-down "U" relative to ground, extending along a periphery of the backrest (3) and having has at least a sixth bearing capacity (P6) having a value between the first bearing capacity (P1) and the second bearing capacity (P2); and a foam inner zone (15) extending at about the centre of the backrest (3), is surrounded on three sides by the outer zone (14), wherein the foam inner zone has a side that the cushion (2) and has a fourth bearing capacity (P4) smaller than the sixth bearing capacity (P6) and the second bearing capacity (P2), wherein the foam outer zone (14) of the bearing structure (5) of the backrest (3) has two different bearing capacities: an upper part of the foam outer zone (14) has the sixth bearing capacity (P6) while a lower part of the foam outer zone (14) has the first bearing capacity (P1) higher than the sixth bearing capacity (P6).

23. A seat (1) for a vehicle comprising a bearing structure (5), divided into an elastically deformable cushion (2) and a backrest (3);
the bearing structure (5) of the cushion (2) comprising: a foam outer zone (8), wherein the foam outer zone is substantially U-shaped, and extends at least along a rear and lateral periphery of the cushion (2) and has a first bearing capacity (P1); a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and a first foam insert (10), is completely arranged within the foam inner zone (9), is at the centre of the cushion (2) and has a third bearing capacity (P3) smaller than the second bearing capacity (P2);
the bearing structure (5) of the backrest (3) comprising: a foam outer zone (14) having a shape of an upside-down "U" relative to ground, extending along a periphery of the backrest (3) and having has at least a sixth bearing capacity (P6) having a value between the first bearing capacity (P1) and the second bearing capacity (P2); a foam inner zone (15) extending at about the centre of the backrest (3), is surrounded on three sides by the outer zone (14), wherein the foam inner zone has a side that the cushion (2) and has a fourth bearing capacity (P4) smaller than the sixth bearing capacity (P6) and the second bearing capacity (P2); and two contour zones (20) laterally delimiting the foam outer zone (14), and wherein the two contour zones (20) have a seventh bearing capacity (P7), which is greater than the sixth bearing capacity (P2), and rise from the backrest (3) to define two side panels that provide lateral containment to the backrest (3).

24. The seat (1) according to claim 23, wherein:
the seventh bearing capacity (P7) ranges from 110% to 170% of the first bearing capacity (P1); and
the seventh bearing capacity (P7) ranges from 11.0 to 13.0 kPa.

25. The seat (1) according to claim 1, further comprising an upholstery layer (6) overlaying the backrest (3), wherein the upholstery layer (6) is configured to provide two spaced apart twin through windows (7) to expose) internal backrest structure (3) lying underneath.

26. A seat (1) for a vehicle comprising a bearing structure (5), divided into an elastically deformable cushion (2) and a backrest (3), the bearing structure (5) of the cushion (2) comprising:
a foam outer zone (8), wherein the foam outer zone is substantially U-shaped, and extends at least along a rear and lateral periphery of the cushion (2) and has a first bearing capacity (P1);
a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and
a first foam insert (10), is completely arranged within the foam inner zone (9), is at the centre of the cushion (2) and has a third bearing capacity (P3) smaller than the second bearing capacity (P2);
wherein the first foam insert (10) at least partially has a truncated cone-shape, which reduces a size thereof moving away from backrest (3).

27. A seat (1) for a vehicle comprising a bearing structure (5), divided into an elastically deformable cushion (2) and a backrest (3), the bearing structure (5) of the cushion (2) comprising:
a foam outer zone (8), wherein the foam outer zone is substantially U-shaped, and extends at least along a rear and lateral periphery of the cushion (2) and has a first bearing capacity (P1);
a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1); and
a first foam insert (10), is completely arranged within the foam inner zone (9), is at the centre of the cushion (2) and has a third bearing capacity (P3) smaller than the second bearing capacity (P2);
wherein the foam outer zone (8) comprises two separate ribs (12), which extend within the foam inner zone (9) and a flank part of the first foam insert (10).

28. A seat (1) for a vehicle comprising a bearing structure (5), divided into an elastically deformable cushion (2) and a backrest (3), the bearing structure (5) of the cushion (2) comprising:
a foam outer zone (8), wherein the foam outer zone is substantially U-shaped, and extends at least along a rear and lateral periphery of the cushion (2) and has a first bearing capacity (P1);

a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1);

a first foam insert (10), is completely arranged within the foam inner zone (9), is at the centre of the cushion (2) and has a third bearing capacity (P3) smaller than the second bearing capacity (P2); and two second foam inserts (11), which are separate from one another and are arranged next to one another completely within the foam inner zone (9), wherein the two second foam inserts are located between the first foam insert (10) and the backrest (3) and have a fourth bearing capacity (P4) smaller than the third bearing capacity (P3).

29. The seat (1) according to claim 28, wherein each of the two second foam inserts (11) has a rectangular shape.

30. The seat (1) according to claim 28, wherein:
the fourth bearing capacity (P4) ranges from 60% to 72% of the second bearing capacity (P2); and
the second bearing capacity (P2) ranges from 5.4 to 6.6 kPa and the fourth bearing capacity (P4) ranges from 3.6 to 4.4 kPa.

31. A seat (1) for a vehicle comprising a bearing structure (5), divided into an elastically deformable cushion (2) and a backrest (3), the bearing structure (5) of the cushion (2) comprising:

a foam outer zone (8), wherein the foam outer zone is substantially U-shaped, and extends at least along a rear and lateral periphery of the cushion (2) and has a first bearing capacity (P1);

a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1);

a first foam insert (10), is completely arranged within the foam inner zone (9), is at the centre of the cushion (2) and has a third bearing capacity (P3) smaller than the second bearing capacity (P2); and an outer contour zone (19) that is U-shaped, surrounds the foam inner zone (9) and the foam outer zone (8) at a front and sides thereof, and has a seventh bearing capacity (P7) higher than the first bearing capacity (P1), and laterally defines a pair of side panels that provide lateral containment to the cushion (2).

32. The seat (1) according to claim 31, wherein:
the seventh bearing capacity (P7) ranges from 110% to 170% of the first bearing capacity (P1); and
the seventh bearing capacity (P7) ranges from 11.0 to 13.0 kPa.

33. A seat (1) for a vehicle comprising a bearing structure (5), divided into an elastically deformable cushion (2) and a backrest (3), the bearing structure (5) of the cushion (2) comprising:

a foam outer zone (8), wherein the foam outer zone is substantially U-shaped, and extends at least along a rear and lateral periphery of the cushion (2) and has a first bearing capacity (P1);

a foam inner zone (9), wherein the foam inner zone (9) extends at about a centre of the cushion, and is surrounded at least by the foam outer zone (8), wherein the foam inner zone (9) has a second bearing capacity (P2) smaller than the first bearing capacity (P1);

a first foam insert (10), is completely arranged within the foam inner zone (9), is at the centre of the cushion (2) and has a third bearing capacity (P3) smaller than the second bearing capacity (P2); and wherein it is provided an upholstery layer (6) overlaying the backrest (3), wherein the upholstery layer (6) is configured to provide two spaced apart twins through windows (7) to expose internal backrest structure (3) lying underneath.

* * * * *